Figure 1:
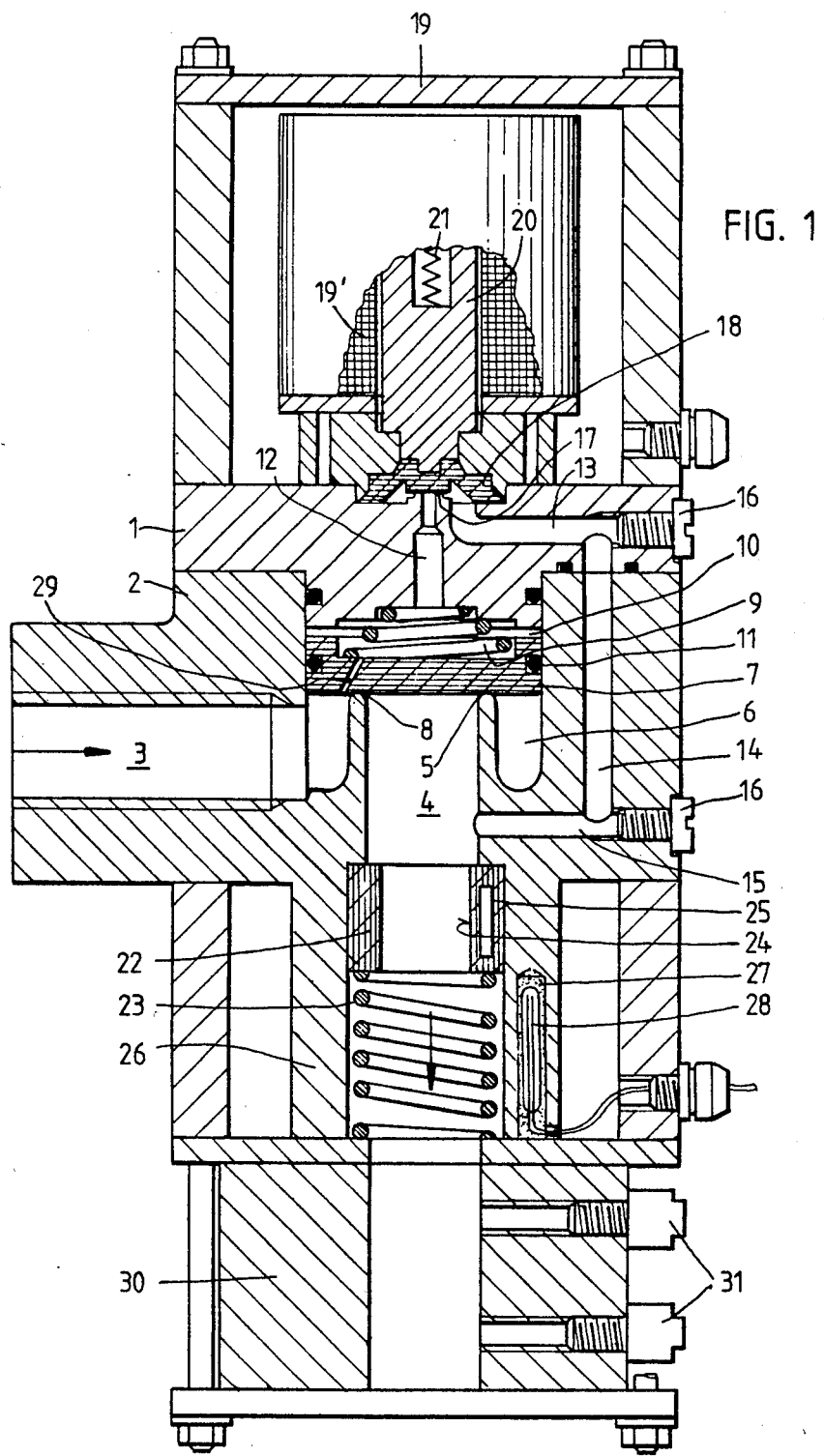

United States Patent [19]

Boschung et al.

[11] Patent Number: 4,557,420
[45] Date of Patent: Dec. 10, 1985

[54] ELECTROMAGNETICALLY CONTROLLABLE SPRAY VALVE AND SPRAY SYSTEM

[75] Inventors: Marcel Boschung, Schmitten; Walter Zehnder, St. Antoni, both of Switzerland

[73] Assignee: Boschung Mecatronic AG, Schmitten, Switzerland

[21] Appl. No.: 529,164

[22] Filed: Sep. 2, 1983

[30] Foreign Application Priority Data

Sep. 10, 1982 [CH] Switzerland .................... 5395/82

[51] Int. Cl.⁴ ............................................ A01G 25/02
[52] U.S. Cl. ..................................... 239/66; 239/74; 239/172
[58] Field of Search ............... 239/71, 74, 170, 172, 239/200, 201, 202; 404/111, 107

[56] References Cited

U.S. PATENT DOCUMENTS 3,540,655 11/1970 Hinrichs ........................... 239/202
4,467,961 8/1984 Coffee et al. ..................... 239/71

FOREIGN PATENT DOCUMENTS 1926637 2/1972 Fed. Rep. of Germany .

Primary Examiner—Andres Kashnikow
Assistant Examiner—Scott D. Malpede
Attorney, Agent, or Firm—Dann, Dorfman, Herrell and Skillman

[57] ABSTRACT

The spray valve comprises a cylindrical component having a central passage, which body is slidingly disposed in a widened portion of the valve body. The cross-sectional area of the central passage is smaller than that of the widened portion, so that the cylindrical component is displaced outwardly against the return force of a spring by the flow occuring when the spray valve is opened. A permanent magnet is embedded in the wall of the cylindrical component. In the wall of the valve body surrounding the widened portion thereof there is a blind bore in which a reed contact is inserted. Through the flow of liquid occuring when the spray valve is opened, the magnet is displaced into the field of response of the reed contact, which thus indicates the opening of the spray valve. This spray valve is intended to be utilized in a system for spraying a thawing agent. A plurality of control circuits are disposed along a roadway, one of the spray valves being associated with each control circuit. The reed contacts make possible a remote indication of the operating readiness of the individual spray valves, making the spraying system much more reliable.

8 Claims, 6 Drawing Figures

ELECTROMAGNETICALLY CONTROLLABLE SPRAY VALVE AND SPRAY SYSTEM

This invention relates to the spraying of liquids and to valves used for that purpose, and in particular to an electromagnetically controllable spray valve for liquids, of the type having a valve body including an inlet duct and an outlet duct opening into a spray nozzle head, a valve disk guided for axial movement and formed as a piston, an annular chamber communicating with the inlet duct, which chamber surrounds the intake opening of the outlet duct, a valve seat disposed at that intake opening, against which valve seat the spring-biased valve disk rests when the spray valve is closed, a piston chamber disposed on the side of the valve disk remote from the intake opening, which piston chamber is connectible to the outlet duct via a bypass, a control valve disposed in the secondary duct, and an electromagnet for actuating the control valve.

The invention further relates to a system for spraying a thawing agent on roadways utilizing a plurality of spray valves, of the type having a pressure line disposed along the roadway for the liquid thawing agent, a pump for conveying the thawing agent from a reservoir into the pressure line, and control means for controlling the pump and the spray valves, the latter being connected to the control means by a control cable disposed along the roadway.

German Pat. No. 1,926,637 describes a magnetically controllable valve in which the passage between an inlet duct and an outlet duct is closed, when the valve is closed, by a piston-like valve part movable axially. Disposed on the side of the movable valve part remote from the valve seat is a piston chamber which communicates via a small radial bore with the inlet duct and is also connectible to the outlet duct via a central bore in the movable valve part. The entry to the central bore is closed by a packing which is pressed against the rim of that entry by a spring, so that pressure can build up in the piston chamber to press the movable valve part into the closure position. For opening the valve, packing is lifted off the entry to the central bore against the return force of the spring with the aid of an electromagnet, so that the pressure in the piston chamber drops rapidly. This causes the movable valve part to move upward, opening the way from the inlet duct into the outlet duct as long as the electromagnet is excited.

In many applications, it would be desirable to have an indication that the spray valve is functioning properly.

Hence it is an object of this invention to provide an improved spray valve having a means by which it may be easily ascertained whether the valve is open or not.

To this end, the spray valve according to the present invention, of the type initially mentioned, comprises means responsive to the flow of the liquid, with a switch that is closed when the liquid flows through the open spray valve.

It is a further object of this invention to provide a spraying system wherein the spray valves can be remotely controlled by simple means from a control apparatus.

To this end, in the spraying system according to the present invention, of the type initially mentioned, a control circuit is associated with each of the spray valves, each of the control circuits is connected to the control means via the control cable, and the control cable contains at most twelve wires regardless of the number of spray valves.

Figure 2:
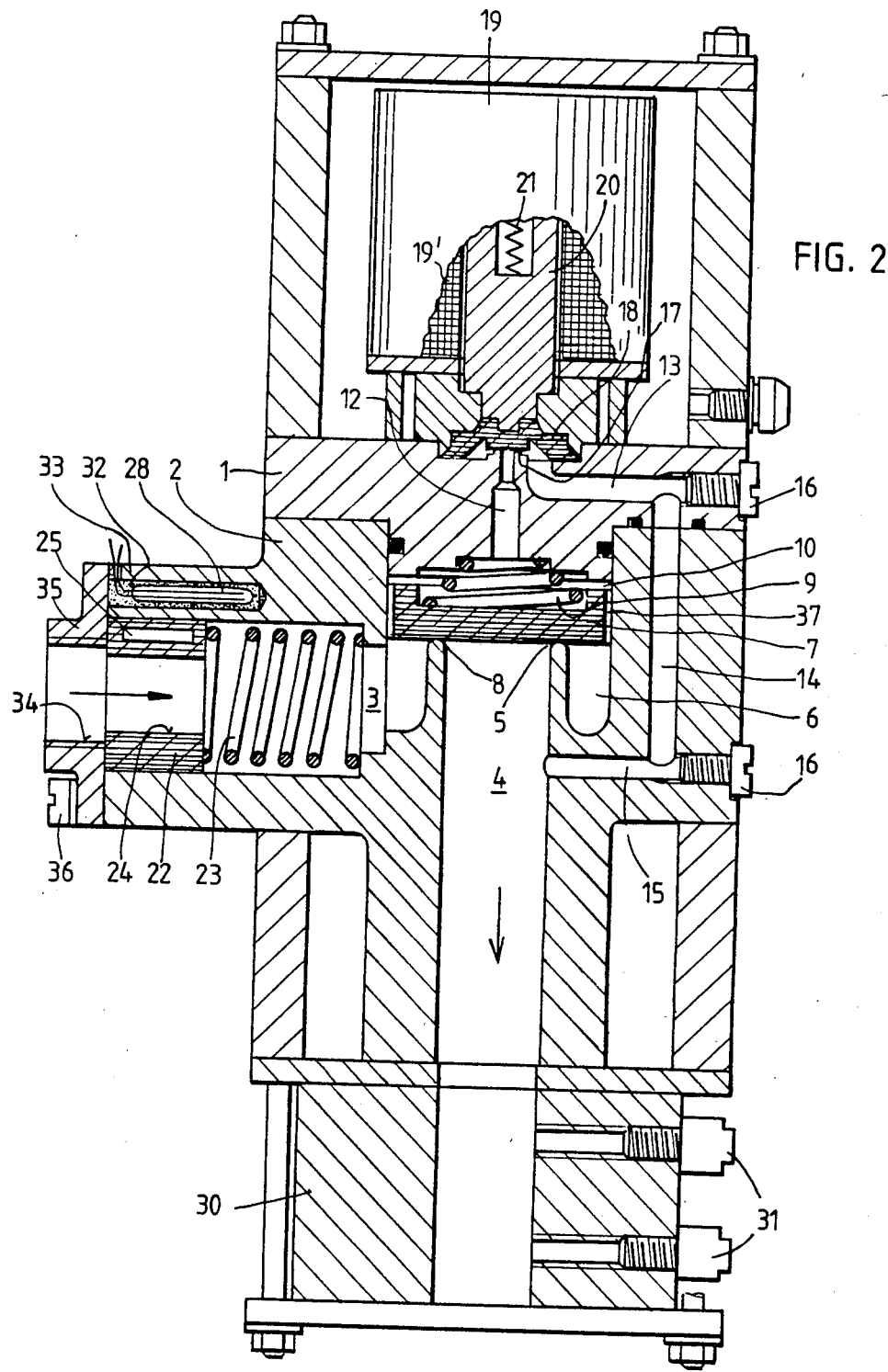
Figure 3:
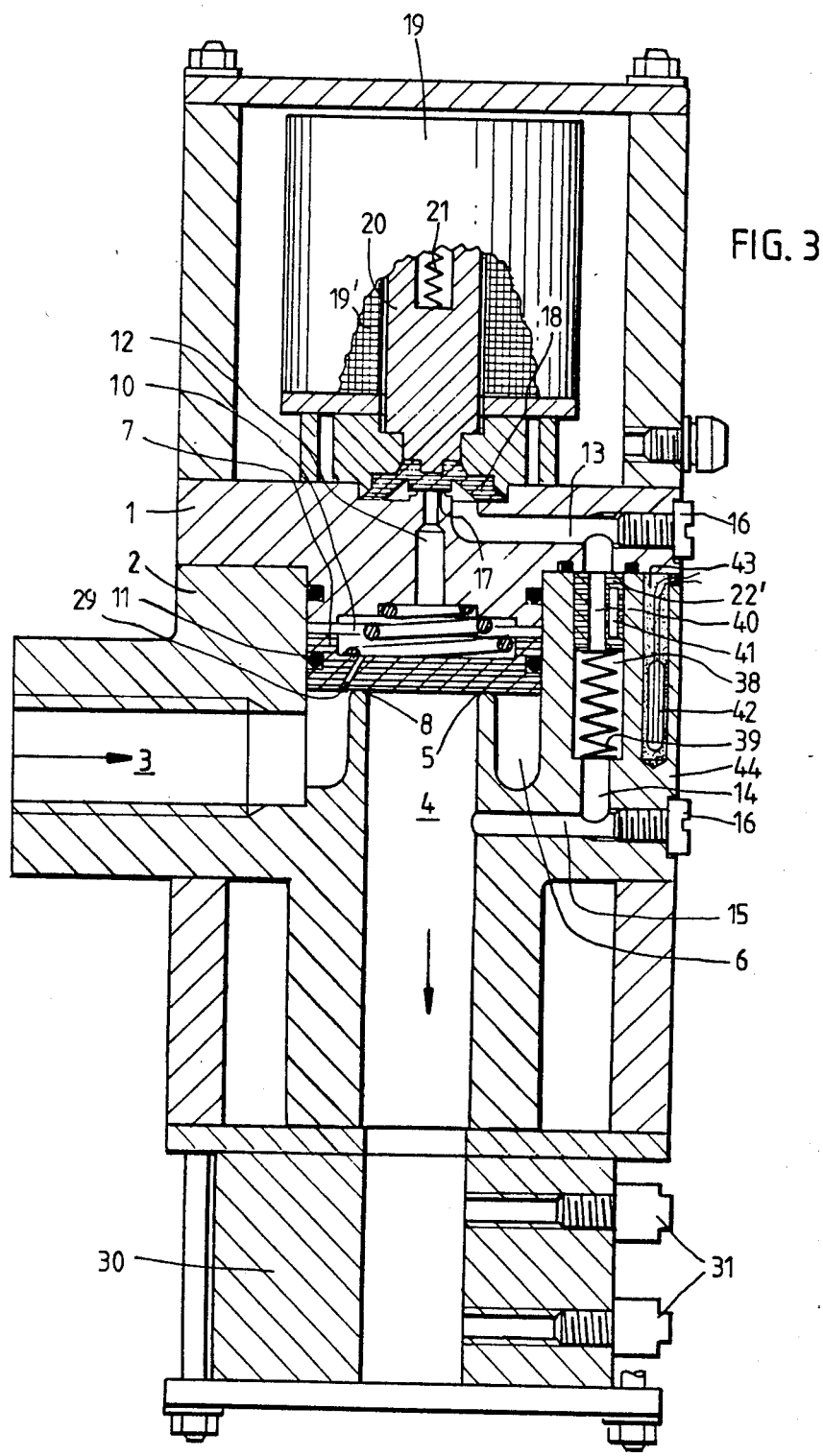
Figure 4:
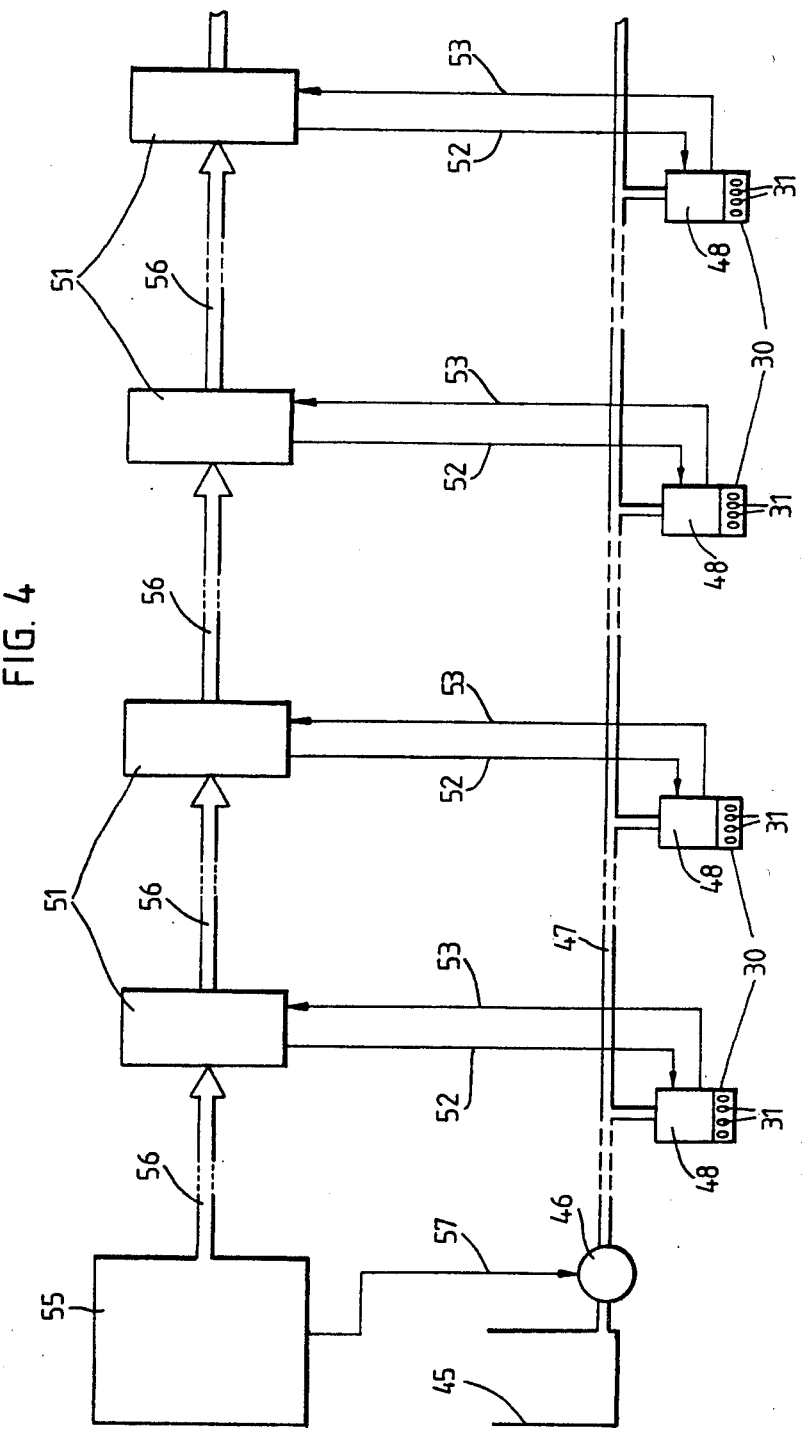
Figure 5:
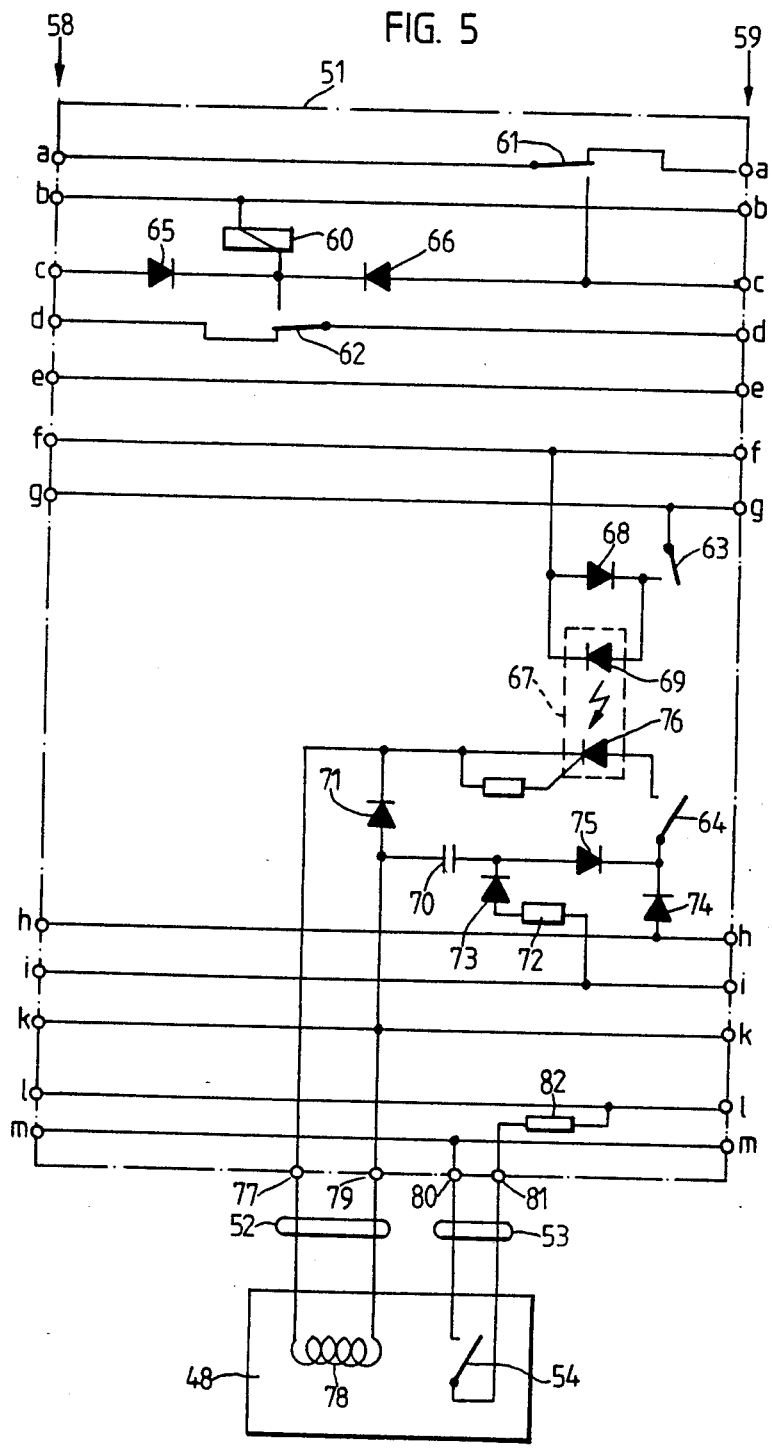
Figure 6:
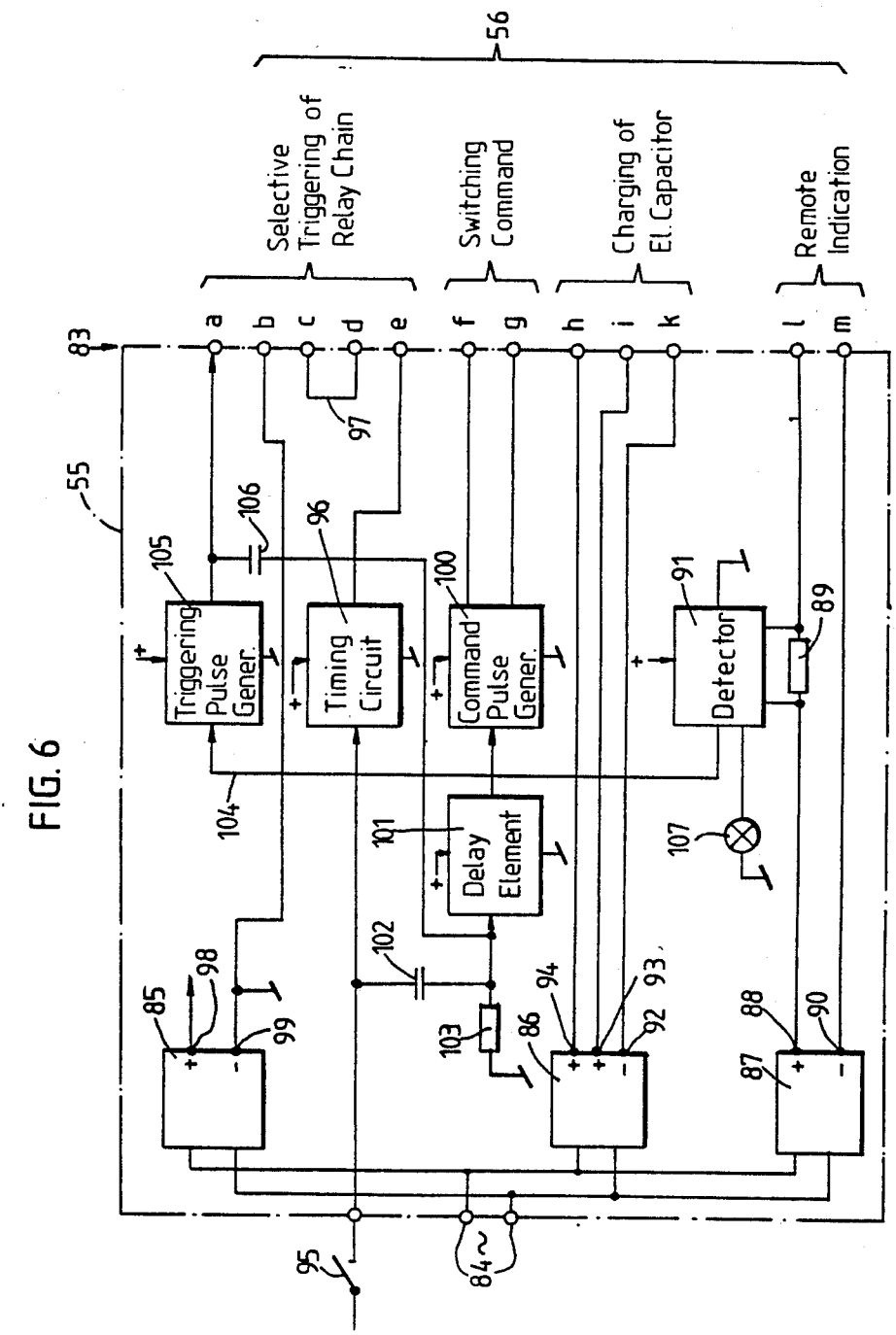

Preferred embodiments of the invention will now be described in detail with reference to the accompanying drawings, in which:

FIG. 1 is an elevation, partially in section, of a spray valve in a first embodiment of the invention, FIG. 2 is an analogous view of a second embodiment, FIG. 3 is an analogous view of a third embodiment, FIG. 4 is a block diagram of a spraying system in an embodiment, of the invention, a control circuit being associated with each spray valve, FIG. 5 is a diagram of one of the control circuits, and FIG. 6 is a block diagram of a control means in the spraying system according to FIG. 4.

In the spray valve illustrated in FIG. 1, a valve body composed of two parts 1 and 2 contains an inlet duct 3, an outlet duct 4, and an annular chamber 6 surrounding an intake opening 5 of the outlet duct 3, with which chamber 6 communicates. When the spray valve is closed, a valve disk 7 rests against a valve seat 8 bounding opening 5. In this position, disk 7 is held by a weak conical spring 9.

On the side of disk 7 remote from opening 5 there is a piston chamber 10 bounded by disk 7 and the first part 1 of the valve body. Spring 9 is accommodated in chamber 10, and disk 7 is axially displaceable within that chamber. An annular gasket is disposed in a groove 11 running along the periphery of valve disk 7. Piston chamber 10 can communicate with outlet duct 4 by means of a bypass comprising a central bore 12 and a radial bore 13 in part 1 of the valve body, plus a bore 14 running axially and a radial bore 15 in part 2 of the valve body. The outer ends of radial bores 13 and 15 are closed by screws 16. Disposed in the bypass is a control valve formed of a valve seat 17 and a movable, resilient valve component 18. Situated above body part 1 is an electromagnet having a winding 19' and an armature 20, shown partially in section, which moves upward, as viewed in FIG. 1, against the bias of a spring 21 upon exciting of the winding. Resilient valve component 18 is thereby lifted off central bore 12, and piston chamber 10 communicates with outlet duct 4 via the bypass described above.

In a widened portion of outlet duct 4, a hollow cylindrical body 22 is mounted for axial displacement against the return force of a spring 23. The cross-sectional area of the central passage 24 of body 22 is smaller than the cross-sectional area of duct 4 in front of body 22. Embedded in annular body 22 is a permanent magnet 25. In a valve-body wall 26 surrounding the widened portion of duct 4 there is a blind bore 27 in which a reed contact 28 is disposed. Reed contact 28 is fixed in bore 27 in such a way that its contact is open when annular body 22 is in the position shown in FIG. 1, and closed when body 22, owing to an effect to be described below, is in the vicinity of reed contact 28.

When inlet duct 3 is connected to a line (not shown in FIG. 1) containing a pressurized liquid, annular chamber 6 fills with that liquid, which then flows through a bore 29 in the peripheral region of disk 7, into piston chamber 10, and into central bore 12. Because bore 12 is closed by movable, resilient valve component 18, the liquid in chamber 10 is subjected to the same pressure as the liquid in inlet duct 3. As a result, valve disk 7 is pressed with relatively great force against valve seat 8, and the spray valve is thereby tightly closed.

If electromagnet 19 is excited and armature 20 thereby moved slightly upward, as viewed in FIG. 1, valve component 18 is separated from valve seat 17, and the liquid in chamber 10 flows through central bore 12 and axial bore 13 of body part 1 and through axial bore 14 and radial bore 15 of body part 2 into outlet duct 4. The liquid in piston chamber 10 can flow off. The afterflow of liquid through narrow bore 29 in disk 7 undergoes a drop in pressure owing to that bore. Thus, the pressure falls in chamber 10, and disk 7 is lifted off seat 8, so that the liquid from annular chamber 6 can flow directly into outlet duct 4.

Because the cross-sectional area of the central passage 24 of annular body 22 is smaller than that of outlet duct 4, body 22 is moved outward against the bias of spring 23, whereby permanent magnet 25 comes into the field of response of reed contact 28 and ensures that the contact is closed. In this way, it is indicated that the liquid is flowing through the open spray valve.

If electromagnet 19 ceases to be excited, spring 21 pushes armature 20 down, and hence resilient valve component 18 against valve seat 17, whereby the earlier-mentioned bypass is closed. Chamber 10 now communicates with inlet duct 3 only via bore 29 in the periphery of disk 7, whereby the pressure in chamber 10 builds up again to that in duct 3. As soon as this pressure is reached, valve disk 7 is pressed axially against valve seat 8 by spring 9, thus closing the spray valve. Since disk 7 is again resting on seat 8, no more liquid flows through outlet duct 4, and annular body 22 is forced back by spring 23 into the position shown in FIG. 1. Hence magnet 25 moves out of the field of response of reed contact 28, and the latter reopens to indicate that no more liquid is flowing through duct 4.

The end face of body part 2, which surrounds duct 4, is closed off by a spray nozzle head 30 which is equipped with a plurality of spray nozzles 31 for uniformly spraying an aera with liquid. Spray nozzle head 30 also serves as a bearing shoulder for spring 23.

FIG. 2 shows a second embodiment of the spray valve according to the invention. Those parts having the same form and function as in the first embodiment are designated by the same reference numerals as in FIG. 1. The difference between the first and second embodiments is that in the latter, annular body 22 with the embedded permanent magnet 25 is situated in a widened portion of inlet duct 3. Accordingly, reed contact 28 is accommodated in a blind bore 32 in wall 33 of body part 2. A flange 35 provided with an internal thread 34 is attached to the end face of body part 2 surrounding duct 3 and held by a number of screws 36, only one of which is seen in FIG. 2. The cross-sectional area of central passage 24 of body 22 being smaller than the cross-sectional area in the region of thread 34 and of duct 3, body 22 is pushed inward against the bias of spring 23 by the flow of liquid when the spray valve is opened, so that magnet 25 comes into the field of response of reed contact 28 and closes it.

Instead of the peripheral bore 29, valve disk 7 has at least one groove 37 running axially on its circumference. It is through this groove that liquid from annular chamber 6 reaches piston chamber 10.

Otherwise, the spray valve illustrated in FIG. 2 operates in the same way as that of FIG. 1. When the valve is open and liquid is flowing through it, this is indicated by means of reed contact 28.

The embodiment shown in FIG. 3 differs from the other two described above in that an annular body 22', corresponding to the annular body 22, is disposed in a widened portion 38 of axial bore 14 in body part 2, bore 14 forming part of the bypass. A spring 39 presses body 22', having a central passage 40, lightly against a shoulder formed by body part 1. Embedded in the wall of body 22' is a permanent magnet 41 which cooperates with a reed contact 42 accommodated in a blind bore 43 in valve body wall 44 surrounding portion 38 of bore 14.

The cross-sectional area of passage 40 is larger than that of bore 29 near the periphery of valve disk 7 and smaller than that of bore 14.

In the closed position of the spray valve shown in FIG. 3, reed contact 42 is open. When electromagnet 19 is excited, movable valve component 18 lifts off valve seat 17, and the liquid in piston chamber 10 flows through the mentioned bypass into outlet duct 4. At this time, body 22' with magnet 41 moves downward, as viewed in FIG. 3, whereby magnet 41 comes into the field of response of reed contact 42, so that the latter closes to indicate that the spray valve is open.

When the current exciting electromagnet 19 is shut off, the control valve formed in the bypass by valve component 18 and seat 17 is closed, and body 22' returns to the position shown in FIG. 3. This causes reed contact 42 to open again.

In the spray valves described above, it is indicated by means of the incorporated reed contacts 28 and 42 whether the spray valve is closed or whether liquid is flowing through the open spray valve.

Bodies 22 and 22' and at least body part 2 are of non-ferromagnetic material, e.g., light metal or plastic. Springs 23 and 39 may be of spring bronze.

FIG. 4 is a diagram of a system for spraying a liquid thawing agent on a roadway. From a reservoir 45, the thawing agent is conveyed by means of a pump 46 into a pressure line 47 laid along the roadway (not shown). Near the edge of the roadway, remotely controlled spray valves, e.g., of the kind described above, are disposed at intervals of from 5 to 15 meters. The inlet ducts of these spray valves 48 are connected to line 47, and nozzle heads 30 with a plurality of nozzles 31 are connected to the outlet ducts of the valves 48.

Associated with each spray valve 48 is a control circuit 51. The electromagnet winding of the respective valve 48 is excited over a control line 52 when that valve is to be opened. A revertive-signal contact 54 of the spray valve is connected to its control circuit 51 by a revertive-signal line 53, so that a remote indication takes place when the liquid thawing agent flows out of pressure line 47 through valve 48 to nozzle head 30.

A control apparatus 55 is connected via a section of a control cable 56 to the adjacent control circuit 51, and each two adjacent circuits 51 are interconnected by a further section of cable 56. Although only four control circuits 51 and four spray valves 48 are shown in FIG. 4, the system comprises a greater number of such circuits and valves.

Whenever necessary, control apparatus 55 switches pump 46 on via line 57 and opens the spray valves 48 in sequence, only one at a time, over control cable 56 and control circuits 51. With this type of control, pump 46 and pressure line 47 can be designed to operate just a single one of the spray valves 48 and spray nozzle heads 30.

FIG. 5 is a diagram of one of the control circuits 51 with the connections to the associated spray valve 48. Circuit 51 has twelve input terminals 58 and twelve output terminals 59 for connecting the twelve-wire control cable 56. There is also a relay 60 having two two-way contacts 61 and 62 and two operating contacts 63 and 64. Input terminal 58a is connected to the movable part of two-way contact 61, and output terminal 59a is connected to the fixed contact part of two-way contact 61 which, in the off-position of relay 60, is electrically connected to the movable contact part. Input terminal 58b is connected directly to output terminal 59b, as well as to one of the terminals of relay 60. Input terminal 58c is connected to output terminal 59c through a series connection of two diodes 65 and 66 and also to the other fixed contact part of two-way contact 61. The interconnected cathodes of diodes 65 and 66 are connected to the other terminal of relay 60. Terminal 58d, in the off-position of relay 60, is connected via its two-way contact 62 to output terminal 59d. The fixed contact part of two-way contact 62, open in the off-position of relay 60, is connected to the other terminal of relay 60, as well as to the cathodes of diodes 65 and 66. Input terminal 58e is connected directly to output terminal 59e.

By connecting a number of control circuits 51 in succession, i.e., output terminals 59a-59e of one circuit to input terminals 58a-58e of the next, by means of cable 56, a meter relay chain formed of the relays 60 is obtained when input terminals 58c and 58d of the first control circuit 51 are interconnected and output terminals 59d and 59e of the last circuit 51 are interconnected.

Input terminal 58b of the first circuit 51 is connected to the negative terminal of a voltage source 85 in control apparatus 55. Input 58e of the first circuit 51 is connectible to the other terminal of voltage source 85, and positive pulses are supplied to input terminal 58a for selecting the individual control circuits 51.

Input terminal 58f is directly connected to output terminal 59f and to one terminal of an opto-electronic coupler 67. Input terminal 58g is connected to output terminal 59g and, via operating contact 62 of relay 60, to the other terminal of opto-electronic coupler 67. Connected in parallel to the two terminals of coupler 67 is a diode 68 for protecting the LED 69 of the opto-electronic coupler. Input terminal 58k is connected to output terminal 59k, to the negative terminal of an electrolytic capacitor 70, and to the anode of a diode 71. Input terminal 58i is connected to output terminal 59i and, across a resistor 72 and a diode 73, to the positive terminal of electrolyte capacitor 70. Also across resistor 72 and diode 73, capacitor 70 is charged when the system is not operating. Input terminal 58h is connected to output terminal 59h and to the anode of a diode 74. The cathode of diode 74 is connected to operating contact 64 of relay 60, which is also connected via a diode 75 to the positive terminal of capacitor 70. The other side of contact 64 is connected via a receiving element 76 of opto-electronic coupler 67, e.g., a photothyristor, an output terminal 77, and line 52 to one terminal of the winding 78 of the electromagnet of the spray valve 48. The other terminal of winding 78 is connected via line 52 and an output terminal 79 to input terminal 58k and output terminal 59k.

When relay 60 is excited and operating contacts 63 and 64 are accordingly closed, the anode of LED 69 is connected via operating contact 63 to input terminal 58g, on the one hand, and the positive terminal of the charged electrolytic capacitor 70 is applied via diode 75 and the closed operating contact 64 to photothyristor 76, on the other hand. If a voltage is thereafter applied to input terminals 58f and 58g by control apparatus 55, LED 69 illuminates photothyristor 76, which becomes conductive. This causes capacitor 70 to discharge across diode 75, the closed operating contact 64, the conductive photothyristor 76, and winding 78, so that the electromagnet of the spray valve 48 is excited, and the valve opens.

The charged electrolytic capacitor 70 briefly supplies the strong surge current needed for pulling armature 20 of electromagnet 19, as described above in relation to FIG. 1. The retaining current needed for holding armature 20 in pulled position is supplied to winding 78 via input terminal 58i of control circuit 51, diode 74, and the conductive photothyristor 76. Input terminal 58h is supplied by control apparatus 55 with a charging voltage which is applied across resistor 72 and diode 73 to capacitor 70 in order to recharge it after the de-excitation of the spray valve electromagnet initiated by the dropping out of relay 60.

Finally, input terminals 58l and 58m are connected to output terminals 59l and 59m, respectively, and, via output terminals 80 and 81, respectively, and line 53 to revertive-signal contact 54 formed by the reed contacts described above. The connection between input terminals 58l, 58m and output terminals 59l, 59m and the corresponding two wires of control cable 56 form a revertive-signal line from control circuits 51 to control apparatus 55, which revertive-signal line signals back to control apparatus 55 when the thawing agent is actually flowing through spray valve 48 as a result of its having been opened. Output terminal 81 is connected to input terminal 58l across a dropping resistor 82. The dimension of resistor 82 is a characteristic assigned value for each of the control circuits 51. With an appropriate detector circuit (FIG. 6) in control apparatus 55, it can then be ascertained which of the spray valves 48 is not operating properly.

FIG. 6 is a simplified block diagram of control apparatus 55. It comprises output terminals 83a-83m to which the wires of control cable 56 are connected. Three rectifiers 85, 86, and 87 can be connected to the mains over terminals 84. To avoid disturbing voltages or currents, the DC sides of the rectifiers are insulated from one another. Rectifier 87 supplies an output voltage of constant magnitude, and its output terminal 88 is connected across a precision resistor 89 to output terminal 83l. The other output terminal 90 of rectifier 87 is directly connected to output terminal 81m. The input of a detector 91 is connected in parallel to precision resistor 89, so that detector 91 can detect which spray valve 48 is operating properly based on the current flowing through resistor 89, which current is dependent upon the dropping resistor 82 of the respective control circuit 51.

Rectifier 86 has three output terminals 92, 93, and 94. Terminal 92 is the negative output terminal which is connected to output terminal 83k of control apparatus 55. The positive terminal 93 supplies direct current of, say, 24 volts and is connected to output terminal 83i of control apparatus 55. With this voltage, the electrolytic capacitors 70 in the control circuits 51 are charged across the resistors 72 and the diodes 73. Rectifier 86 further comprises a current regulator which can deliver constant direct current over the positive output terminal 94, which is connected to output terminal 83h of control apparatus 55. This constant current is supplied in each case to the excited winding 78 as a retaining current over diode 74 and the closed operating contact 64.

Control apparatus 55 can be set in operation by means of a switch 95 which may be actuated manually or, for example, by means of apparatus as described in U.S. Pat. No. 4,222,044 for generating an early warning signal when there is a danger of ice forming on a roadway. The closing of switch 95 causes a timing circuit 96 to be turned on, which thereafter applies a positive voltage to output terminal 83e of control apparatus 55 for a predetermined length of time. Because output terminal 83e is connected by the first section of control cable 56 to the input terminal 58e of the adjacent control circuit 51, the voltage reaches the output terminal 59e of the last circuit 51 via all the intervening circuits 51, and reaches output terminal 59d of the last circuit 51 via the connection described above. From this output terminal 59d, the current returns in each case via the two-way contact 62 of each of the circuits 51 back to the input terminal 58d of the first control circuit 51, i.e., the one adjacent to control apparatus 55, and over the respective wire of the first section of control cable 56 to output terminal 83d of control apparatus 55. From there the voltage reaches output terminal 83c over a bridge 97, and thence over the first section of control cable 56 to input terminal 58c of the first control circuit 51 and via diode 65 to relay 60.

The above mentioned voltage is delivered by rectifier 85, the positive terminal 98 of which is connected to timing circuit 96, among other things. The negative terminal 99 of rectifier 85 is connected to output terminal 83b of control apparatus 55 and, by the first section of control cable 56, to input terminal 58b of the first circuit arrangement and thus to the other terminal of all relays 60. When timing circuit 96 is switched on, the result is that relay 60 of the first circuit 51 is energized and thereafter holds itself via two-way contact 62. A further result of the energizing of relay 60 is that its operating contacts 63 and 64 close. This causes optoelectronic coupler 67 to be prepared for receiving a switching command generated by a command pulse generator 100 of control apparatus 55. Command pulse generator 100 is controlled by a delay element 101, the input of which is connected via a capacitor 102 to the input of timing circuit 96. Capacitor 102 and a resistor 103 together form a differentiator, so that delay element 101 is triggered when there is a quick rise in voltage, caused by the closing of switch 95, at the input of timing circuit 96. After a brief delay, command pulse generator 100, which may be a monostable flip-flop, is triggered, and a switching command is consequently transmitted to terminals 83f and 83g. The signal representing the switching command arrives via the closed operating contact 63 at LED 69 in control circuit 51, relay 60 of which is energized. Photothyristor 76 is illuminated and made conductive by the lightrays emanating from LED 69. Now electrolytic capacitor 70 can discharge across winding 78, whereby the associated spray valve 48 is opened. The switching command from command pulse generator 100 lasts only until capacitor 70 is discharged about halfway. Triggering of command pulse generator 100 is delayed by delay element 101 by at least the attraction time of relay 60 in order to avoid faulty switching.

When detector 91 determines that the respective revertive-signal contact 54 is closed, it reports this over a line 104 to a triggering pulse generator 105. The latter comprises a timing circuit, not shown in detail, which after a certain lapse of time, during which the thawing agent is sprayed on the roadway from the respective spray head 30 (FIG. 4), transmits a control pulse which is supplied to output terminal 83a of control apparatus 55. From there the triggering pulse reaches input terminal 58a of the first control circuit 51 over the first section of control cable 56, output terminal 59c of the first circuit 51 via the reversed two-way contact 61, input terminal 58c of the second circuit 51 over the second section of cable 56, and relay 60 of the second circuit 51 via diode 65. This relay 60 is therefore energized. Two-way contacts 61 and 62 of relay 60 are reversed, and its operating contacts 63 and 64 are closed. As a result of the reversal of two-way contact 62 of relay 60 of the second control circuit 51, the self-holding of relay 60 of the first control circuit 51 is interrupted, and this latter relay 60 therefore drops out.

The dropping out of relay 60 of the first control circuit 51 causes the respective operating contacts 63 and 64 to be opened, whereby opto-electronic coupler 67 is cut off from input terminal 58g and thus from output terminal 59g of circuit 51, and through switching off of the positive voltage at an anode, photothyristor 76 is blocked until LED 69 lights up again. The triggering pulse generated by triggering pulse generator 105 is also supplied across a capacitor 106 to the input of delay element 101. The leading edge of the triggering pulse therefore causes a delayed signal to be sent on to command pulse generator 100, whereby, in the manner described above, opto-electronic coupler 67 of the second control circuit 51 is triggered, and relay 60 of that circuit 51 is energized. As long as this relay 60 is energized, spary head 30 (FIG. 3) of the second control circuit 51 sprays the section of the roadway associated with that spray head. The above-mentioned timing circuit of triggering pulse generator 105 again determines the length of time during which relay 60 remains attracted. After this time has elapsed, triggering pulse generator 105 transmits a further pulse to output terminal 83a, over the first section of control cable 56 to input terminal 58a of the first control circuit 51, via two-way contact 61 to output terminal 59a of the first circuit 51, over the second section of cable 56 to input terminal 58a of the second circuit 51, and via the reversed two-way contact 61, output terminal 59c of the second circuit 51, the third section of cable 56, input terminal 58c of the third circuit 51, and diode 65 to relay 60 of the third control circuit 51. This relay 60 is thus energized and is held by its associated two-way contact 62, and the self-holding of relay 60 of the second control circuit 51 by the two-way contact 62 just mentioned is interrupted so that this relay 60 drops out, causing the spray valve 48 associated with the second control circuit 51 to close. The pulse generated by triggering pulse generator 105 is also supplied via capacitor 106 to delay element 101, so that after a brief delay, command pulse generator 100 generates a switching command as described above, whereby the magnetic valve of the spray valve associated with the third control circuit 51 is energized. Dropping resistor 82 is connected in via the associated revertive-signal contact 54, and detector 91 ascertains which spray valve is operating properly.

The procedure described above is repeated until the spray valve 48 associated with the last control circuit 51 has been actuated. Timing circuit 96 is adjusted in such a way that it switches off the voltage applied to the output terminal 81e of control apparatus 55 after the spray valve 48 associated with the last circuit 51 has operated properly.

If switch 95 is operated again, the foregoing procedure automatically runs through once more, and the roadway is resprayed with the thawing agent, only one of the spray heads 30 (FIG. 3) spraying the liquid on the road at a time.

Detector 91 is so designed that if it does not receive a timely reply signal after the command pulse generator has generated a switching command, it produces an alarm signal. This is symbolically indicated by an alarm lamp 107. In order that the detector may ascertain when a switching command has been generated, the output of command pulse generator 100 is connected to an input of detector 91.

By means of the system described above, sections of roadway which are particularly endangered can automatically be sprayed with a thawing agent, whereby traffic safety is substantially increased.

What is claimed is:

1. An electromagnetically controllable spray valve for liquids, having a valve body with a spray nozzle head, including an inlet duct and an outlet duct having an intake opening and opening into said spray nozzle head, a spring-biased valve disk formed as a piston and guided for axial movement, an annular chamber communicating with the inlet duct and surrounding the intake opening of the outlet duct, a valve seat disposed at the intake opening, against which valve seat the spring-biased valve disk rests when the spray valve is closed, a piston chamber disposed on the side of the valve disk facing away from the intake opening, a bypass connecting the piston chamber with the outlet duct, a control valve disposed in the bypass, an electromagnet for operating the control valve, and
a device responsive to the flow of the liquid, and having
   a switch which is closed when the liquid flows through the opened spray valve, the device comprising
a cylindrical component having a central bore, a permanent magnet embedded in the wall of the component, and a spring means, the switch being a reed contact disposed in a bore in the valve body wall, said component being displaceably disposed in the bypass, said switch being disposed in the region of the bypass, the passage cross-section of the central bore in the cylindrical component being smaller than the passage cross-section of the bypass in which the component is displaceably disposed, and the cylindrical component and the spring means being so disposed that the component moves against the return force of the spring means when a flow of the liquid occurs through the bypass in which the component is disposed.

2. A system for spraying a liquid thawing agent on a roadway, having a pressure line disposed along the roadway for the liquid thawing agent, a plurality of spray valves according to claim 1 connected at intervals to the pressure line
a pump means for supplying the thawing agent to the pressure line,
control means for controlling the pump means and the spray valves,
a control cable having at least five wires disposed along the roadway, and
a control circuit with input and output terminals associated with each of the spray valves, each of the control circuits being connected to the control means by said control cable, each control circuit including a relay having two two-way contacts and an operating contact, the two-way contacts connecting one of the input terminals of the control circuit to each of the output terminals of the control circuit when the relay is not energized, and a diode adapted to be connected between one of the said input terminals and one of the said output terminals when the relay is energized, the input and output terminals of the control circuits being connected by the first five wires of the control cable to form together with the relays a selectively controllable relay chain.

3. The system of claim 2, wherein each of said control circuits comprises at most twelve input terminals for connecting an incoming section of said control cable and at most twelve output terminals for connecting an outgoing section of said control cable.

4. The system of claim 2, wherein the electromagnet of each spray valve has a winding and each of said control circuits comprises a capacitor chargeable over said control cable and switching means controllable by said operating contact for connecting said capacitor to said winding.

5. The system of claim 4, wherein each said relay comprises a further operating contact, said switching means being an opto-electronic coupler having an input circuit and a transmitter, said further operating contact being connected in series with said input circuit of said opto-electronic coupler and serving the purpose of supplying an exciting and holding current to said winding via a diode, and being further connected to one of said input terminals connected to one of said output terminals, said transmitter of said opto-electronic coupler being connectible via said further operating contact to two of said input terminals connected to two of said output terminals for controlling said opto-electronic coupler.

6. The system of claim 2, wherein two of said input terminals are connected to two of said output terminals, a revertive-signal contact of said spray valve being connected to one of said two input terminals and across a resistor to the other of said two input terminals, and said resistor of each of said control circuits being capable of exhibiting a different value.

7. The system of claim 6, wherein said control means comprises a detector for ascertaining which of said control circuits has operated the said spray valve associated therewith.

8. A system for spraying a liquid thawing agent on a roadway, having pressure line disposed along the roadway for the liquid thawing agent, a plurality of spray valves connected at intervals to the pressure line,
each spray valve being electromagnetically controllable and having an inlet duct and an outlet duct, a valve body between the inlet duct and the outlet duct having a valve seat and a spring-biased valve disk engaging said seat when the spray valve is closed, an electromagnet for operating the spray valve, and a device responsive to the flow of the liquid, and having a switch which is closed when the liquid flows through the opened spray valve, the device comprising a cylindrical component having a bore, said device being displaceably disposed in a passage which is open for the flow of liquid when the valve is opened, a permanent magnet embedded in the wall of the component, and a spring means, the switch being a read contact disposed in the valve body in the region of the component, the passage cross-section of the central bore in the cylindrical component being smaller than the cross-section of the passage in which the component is displaceably disposed, and the cylindrical component and the spring means being so disposed that the component moves against the return force of the spring means when a flow of the liquid occurs through the passage in which the component is disposed, a pump means for supplying the thawing agent to the pressure line, control means for controlling the pump means and the spray valves, a control cable having at least five wires disposed along the roadway, and a control circuit with input and output terminals associated with each of the spray valves, each of the control circuits being connected to the control means by said control cable, each control circuit including a relay having two two-way contacts and an operating contact, the two-way contacts connecting one of the input terminals of the control circuit to each of the output terminals of the control circuit when the relay is not energized, and a diode adapted to be connected between one of the said input terminals and one of the said output terminals when the relay is energized, the input and output terminals of the control circuits being connected by the first five wires of the control cable to form together with the relays a selectively controllable relay chain.

* * * * *